(12) United States Patent
Peana

(10) Patent No.: US 9,934,731 B2
(45) Date of Patent: Apr. 3, 2018

(54) MULTIPLE BACKLIGHT DISPLAY SYSTEM

(71) Applicant: Dell Products L.P., Round Rock, TX (US)

(72) Inventor: Stefan Peana, Austin, TX (US)

(73) Assignee: Dell Products L.P., Round Rock, TX (US)

(*) Notice: Subject to any disclaimer, the term of this patent is extended or adjusted under 35 U.S.C. 154(b) by 70 days.

(21) Appl. No.: 14/952,607

(22) Filed: Nov. 25, 2015

(65) Prior Publication Data
US 2017/0148393 A1  May 25, 2017

(51) Int. Cl.
G09G 3/34       (2006.01)
F21V 8/00       (2006.01)
G02F 1/1335     (2006.01)
G09G 3/36       (2006.01)

(52) U.S. Cl.
CPC .......... G09G 3/3413 (2013.01); G02B 6/009 (2013.01); G02B 6/0083 (2013.01); G02F 1/133608 (2013.01); G09G 3/3648 (2013.01); G02F 2001/133612 (2013.01); G09G 2300/04 (2013.01)

(58) Field of Classification Search
CPC combination set(s) only.
See application file for complete search history.

(56) References Cited

U.S. PATENT DOCUMENTS

2007/0024772 A1* 2/2007 Childers .............. G09G 3/3413
                                              349/68
2016/0131831 A1* 5/2016 Tomomasa ........... G02B 6/0031
                                              348/790

* cited by examiner

*Primary Examiner* — Jennifer Mehmood
*Assistant Examiner* — Deeprose Subedi
(74) *Attorney, Agent, or Firm* — Haynes and Boone, LLP

(57) ABSTRACT

A multiple backlight display system includes a display device having a light guide device including a plurality of edges. An edge backlight device is located along one of the edges of the light guide device. An array backlight device includes a plurality of array backlight zones that are located between the edges of the light guide device. A computing device receives an image for display on the display device and determines a plurality of brightness zones in the image. The computing device then generates backlight driving information using the plurality of brightness zones and provides the backlight driving information to the display device. The backlight driving information is configured to drive the array backlight device such a first array backlight zone provides light having a first brightness that is different than a second brightness of light that is provided by at least one second array backlight zone.

18 Claims, 13 Drawing Sheets

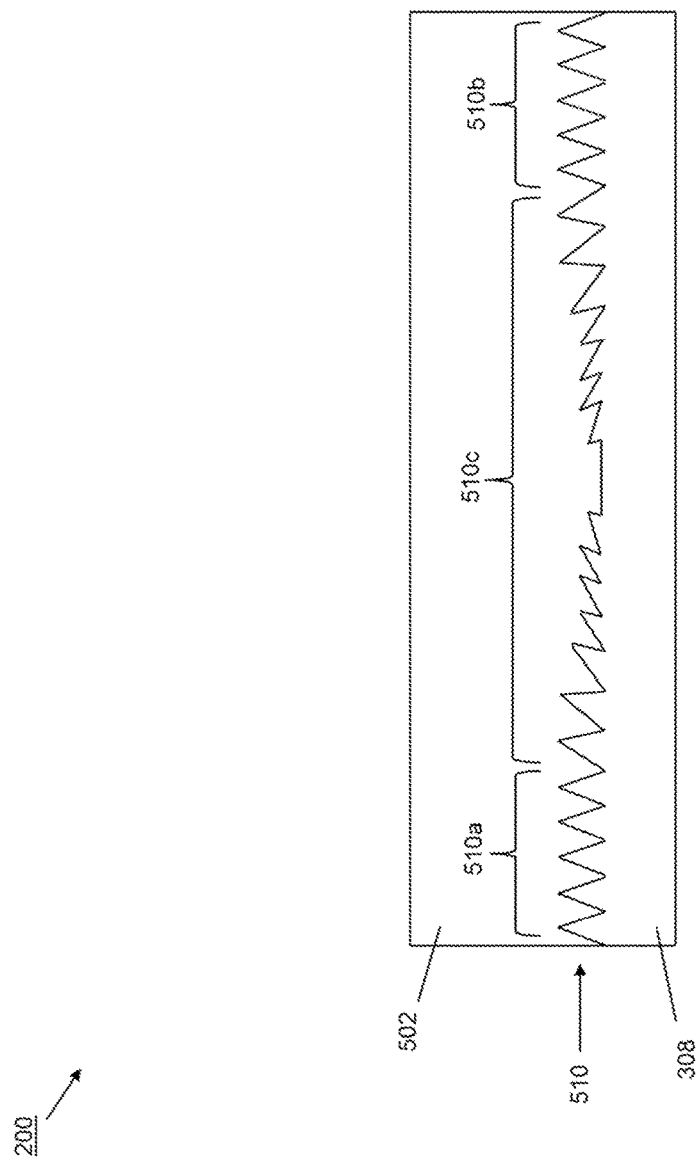

MULTIPLE BACKLIGHT DISPLAY SYSTEM

BACKGROUND

The present disclosure relates generally to information handling systems, and more particularly to a multiple backlight display system for use with an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems are utilized with and/or include display systems for displaying the information handled by the information handling system. Display systems such as, for example, Liquid Crystal Display (LCD) systems, typically include a backlight subsystem, optical distribution films, and an LCD subsystem. The backlight subsystem typically includes a light source device and a light guide device. One common configuration of the backlight subsystem is an "edge-lit" backlight subsystem in which the light source device is located adjacent the edge of the light guide device, with the light guide device distributing the light from the light source device across an area of the LCD subsystem for use in rendering an image. Such edge-lit backlight subsystems are desirable due to their simplicity and energy efficiency. However, edge-lit backlight systems operate to provide back-lighting of the LCD subsystem substantially uniformly, and thus the adjustment of the back lighting of particular portions of an image provided through the LCD subsystem raises some issues.

For example, local dimming of an image can improve image quality and reduce power consumption. However, the use of edge-lit backlight subsystems to perform dimming provides limited improvements. One type of dimming utilizing edge-lit backlight subsystems provides two light source devices along different edges of the light guide device, with those light source devices adjusted in their intensity (referred to as "1-dimensional dimming") to provide some power efficiencies, but limited image improvements that are not truly localized to a particular area of the image provided on the display screen. Rather, typically such edge-lit backlight subsystems provide dimming to the entire image in order to make desired portions of the image darker. Furthermore, edge-lit backlight subsystems are also difficult to implement on mobile computing display devices, as the additional light source devices must be located in the bezel, and tend to undesirably increase bezel dimensions and power consumption.

Accordingly, it would be desirable to provide an improved backlight display system.

SUMMARY

According to one embodiment, a display system includes a display chassis that houses: a light guide device including a plurality of edges; an edge backlight device located along one of the plurality of edges of the light guide device, wherein the edge backlight device is configured to be driven to provide light having a first brightness; and an array backlight device including a plurality of array backlight zones that are located between the plurality of edges of the light guide device, wherein the array backlight device is configured to be driven such that a first array backlight zone of the plurality of array backlight zones provides light having a second brightness that is different than a third brightness of light that is provided by at least one second array backlight zone of the plurality of array backlight zones.

BRIEF DESCRIPTION OF THE DRAWINGS

FIG. 5B is a schematic view illustrating an embodiment of a lens and light guide in the display device of FIG. 6a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
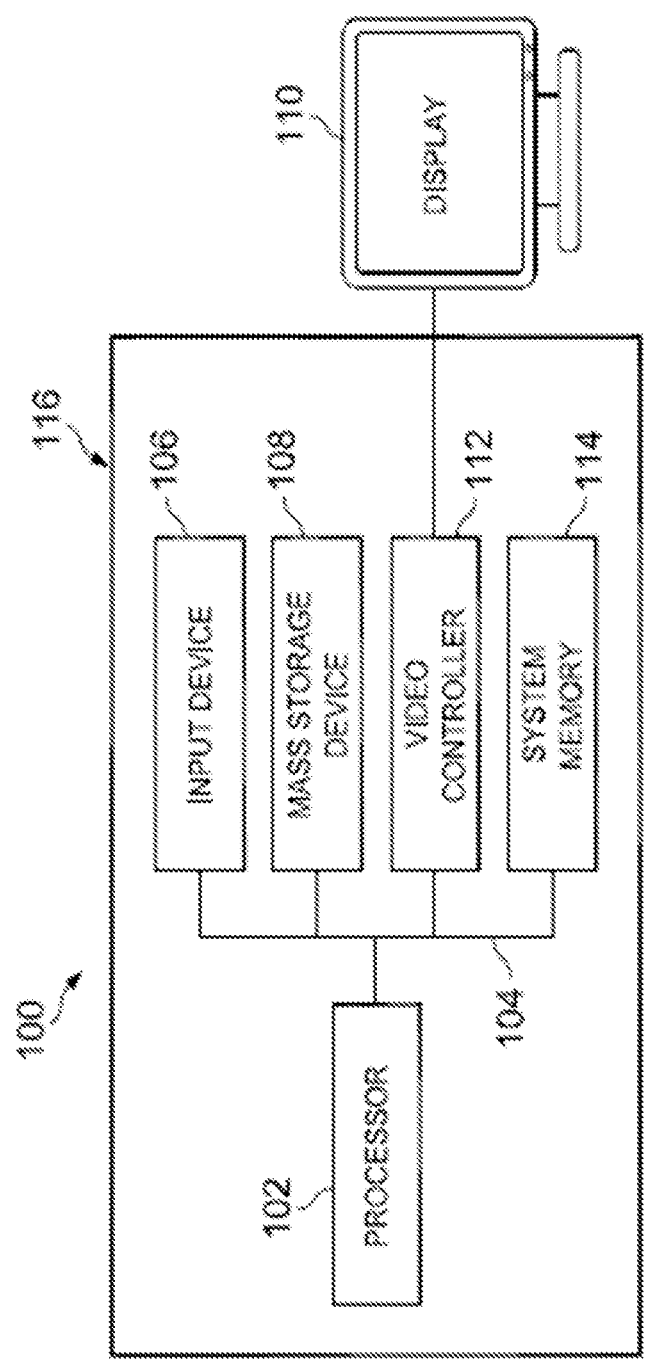
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
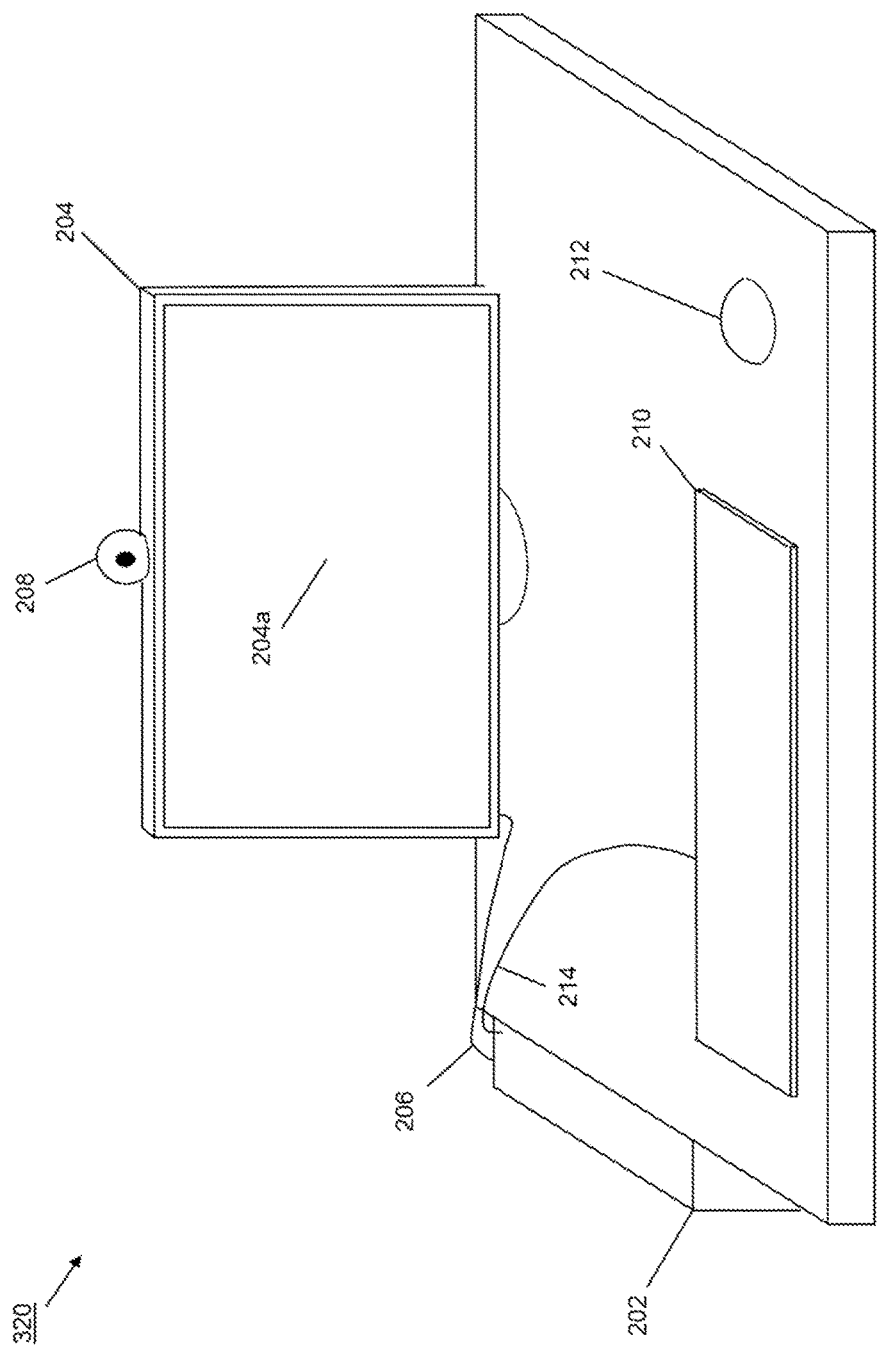
FIG. 2 is a perspective view illustrating an embodiment of a multiple backlight display system.

Referring now to FIG. 2, an embodiment of a multiple backlight display system 200 is illustrated. In an embodiment, the multiple backlight display system 200 may be the IHS 100 discussed above with reference to FIG. 1 and/or include some or all of the components of the IHS 100. In the illustrated embodiment, the multiple backlight display system 200 includes a computing device 202 that is illustrated as a desktop computing device (also known as a "tower"). A display device 204 including a display screen 204 is coupled to the computing device 202 by a cable 206. In the illustrated embodiment, a camera 208 is located on the display device 204, although other locations for the camera 208 (e.g., on the surface that supports the display device 204) will fall within the scope of the present disclosure. A plurality of input devices 210 (e.g., a keyboard) and 212 (e.g., a mouse) are coupled to the computing device 202 via a cable 214 (e.g., to the input device 210) or a wireless connection (e.g., to the input device 212). One of skill in the art in possession of the present disclosure will recognize that the multiple backlight display system 200 may include a variety of other components (e.g., peripheral devices), connections (e.g., power connections), and/or configurations while remaining within the scope of the present disclosure. Furthermore, while the multiple backlight display system 200 has been illustrated as a desktop computing system, the teaching of the present disclosure will be beneficial to a variety of display systems including, for example, laptop/notebook computing systems, tablet computing systems, mobile phones, televisions, and/or a variety of other computing and/or display systems known in the art, and thus those systems are envisioned as falling within the scope of the present disclosure as well.

Figure 3A:
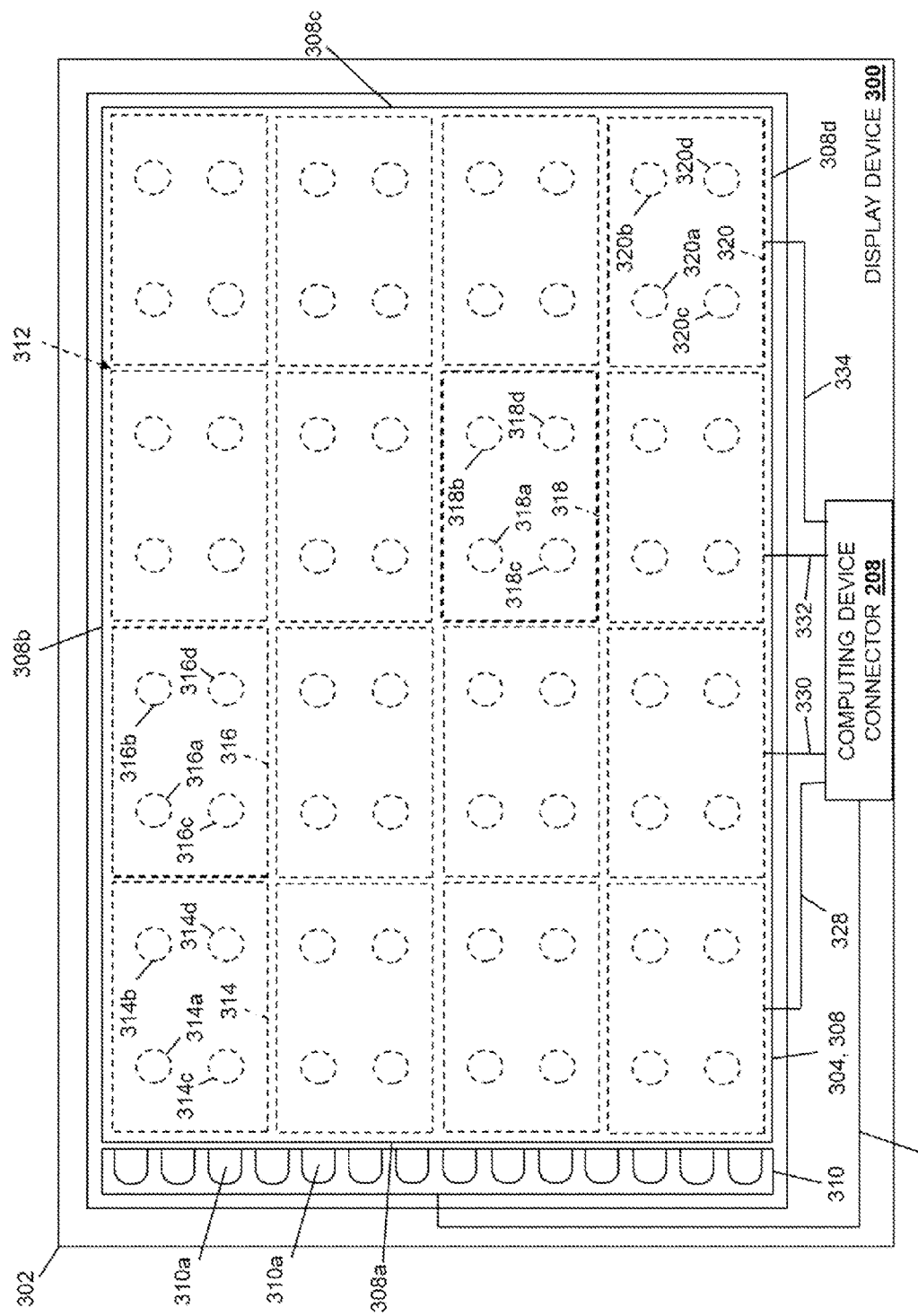
FIG. 3A is a front schematic view illustrating an embodiment of a display device used in the multiple backlight display system of FIG. 2.
Figure 3B:
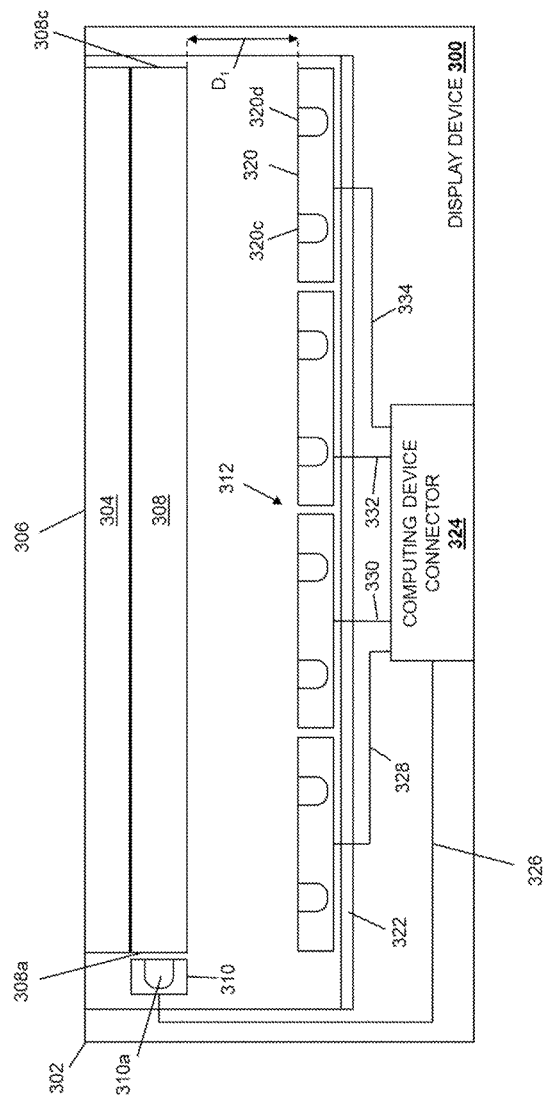
FIG. 3B is a side schematic view illustrating an embodiment of the display device of FIG. 3A.

Referring now to FIGS. 3A and 3B, an embodiment of a display device 300 is illustrated. In an embodiment, the display device 300 may be the display device 204 discussed above with reference to FIG. 2. However, as discussed above, in some embodiments, the display device 300 may be provided as a stand-alone display system or IHS (e.g., the IHS 100 discussed above with reference to FIG. 1) such as a television or display integrated computing system while remaining within the scope of the present disclosure and, as such, may include some or all of the features of the computing devices discussed below. The display device 300 includes a display chassis 302 that houses the components of the display device 300, only some of which are illustrated and described below for clarity. In the illustrated embodiment, a color device 304 is located in the display chassis 302 and may provide or be located immediately adjacent a display screen 306 of the display device 300. In the embodiments discussed below, the color device 304 is described as a Liquid Crystal Display (LCD) color device that may include components such as polarizers, Red/Green/Blue (RGB) color filters, liquid crystals, thin film transistor layers, and/or a variety of other LCD components known in the art. However, one of skill in the art in possession of the present disclosure will recognize that other color devices utilizing backlights will fall within the scope of the present disclosure.

A light guide device 308 is located in the display chassis 302 opposite the color device 304 from the display screen 306. In an embodiment, the light guide device 308 may include a layer of plastic or other material that is configured to diffuse light from backlight light sources (discussed below) using, for example, a plurality of unevenly spaced "bumps" on the light guide device 308, as well as reflector materials to guide otherwise wasted light back to the light guide device 308. However, one of skill in the art in possession of the present disclosure will recognize that a variety of other light guide device components may be provided in the display device 300 while remaining within the scope of the present disclosure. The light guide device 306 includes a plurality of edges 308a, 308b, 308c, and 308d that define a perimeter surface of the light guide device 308. The display chassis 302 houses a edge backlight device 310 that is located along the edge 308a of the light guide device 308. The edge backlight device 310 includes a plurality of lights 310a that, in the embodiments discussed below are Light Emitting Devices (LEDs) that are configured to direct light into the light guide device 308 through the edge 308a. However, other lights and light emitting devices may be substituted for the LEDs while remaining within the scope of the present disclosure. Furthermore, while a single edge backlight device 310 is illustrated and described and being located along a single edge 308a of the light guide device 308, the edge backlight device 310 may be located along different edges of the light guide device 308, and multiple edge backlight device that are substantially similar to the edge backlight device 310 may be provide, with respective edge backlight devices provided adjacent multiple different edges of the light guide device 308 while remaining within the scope of the present disclosure.

The display chassis 302 also houses an array backlight device 312 that provides a plurality of array backlight device zones 314, 316, 318, and up to 320, which are located between the edges 308a-d of the light guide device 308 and configured to direct light into the light guide device 308. While the array backlight device 312 and its array backlight zones are illustrated as located entirely between the edges 308a-d of the light guide device, the array backlight device and its array backlight zones may be considered to be located between the edges 308a-d of the light guide device 308 even when some of the array backlight zones (e.g., those about the perimeter of the array backlight device 312) include some portion that extend past the edges 308a-d of the light guide device 308 (e.g., as they are still configured to direct light into the light guide device 308). In the embodiments discussed below, the edge backlight device 310 and the array backlight device 312 are illustrated and described as sharing a light guide device. However, in other embodiments, there may be multiple light guide devices and/or contiguous light guide devices that may provide substantially separate light guide devices for each of the edge backlight device 310 and the array backlight device 312. Furthermore, while the edge backlight device 310 and the array backlight device 312 are illustrated and described separate devices, in some embodiments, the edge backlight device 310 and the array backlight device 312 may be combined into a single, integrated device while remaining within the scope of the present disclosure. In the illustrated embodiment, the array backlight device 312 is illustrated as including sixteen array backlight zones, but one of skill in the art in possession of the present disclosure will recognize that other numbers of array backlight zones (e.g., fewer array backlight zones, more array backlight zones), other configurations of array backlight zones (e.g., differently dimensioned array backlight zones), and/or other backlight zone characteristics will fall within the scope of the present disclosure. As discussed below, information about the locations, dimensions, and/or other features of the array backlight zones may be stored in association with the color device 304 to define a plurality of color device zones provided by the color device 304, with each respective color device zone located adjacent one of the array backlight zones.

Each of the array backlight zones includes a plurality of lights that, in the embodiments discussed below are Light Emitting Devices (LEDs) that are configured to direct light into the light guide device 308. However, in other embodiments, the light elements for each of the array backlight zones included on the array backlight device 312 may be provided using Organic Light Emitting Diode (OLED) backlighting elements, and/or a variety of other light emitting devices known in the art. In the illustrated example, the array backlight device zone 314 includes lights 314a, 314b, 314c, and 314d; the array backlight device zone 316 includes lights 316a, 316b, 316c, and 316d; the array backlight device zone 318 includes lights 318a, 318b, 318c, and 318d; and the array backlight device zone 320 includes lights 320a, 320b, 320c, and 320d. While each of the array backlight zone is illustrated and described as including four lights, one of skill in the art in possession of the present disclosure will recognize that the array backlight zones may include more lights, fewer lights, different numbers of lights (e.g., relative to each other) while remaining within the scope of the present disclosure. In the embodiment illustrated in FIG. 3B, the array backlight device 312 is located in the display chassis 302 such that it is spaced apart from the light guide device 308 by a distance $D_1$. For example, the distance $D_1$ may be selected such that light emitted from the lights in the array backlight zones is diffused a desired amount (i.e., by traveling over the distance $D_1$) before it reaches the light guide device 308.

In the embodiment illustrated in FIG. 3B, a reflective layer 322 is located opposite the array backlight device 312 from the light guide device 308. For example, the reflective layer 322 may include aluminum foil, a white-pigmented surface, polymer layers alternating between low and high reflective indices, and/or a variety of other reflective layers known in the art. In the illustrated embodiment, the display chassis 302 also includes a computing device connector 324 that is configured to couple to a computing device, discussed in further detail below. However, as discussed above, rather than the computing device connector 324, in some embodiments, the display chassis 302 may house the components of the computing device discussed below to provide a stand-along display system (e.g., a television or display integrated computing device) while remaining within the scope of the present disclosure. In the illustrated embodiment, the computing device connector 324 includes at least one coupling 326 to the edge backlight device 310 that is configured to transmit backlight driving information to the edge backlight device 310. In some examples discussed below, such backlight driving information may be provided over a single coupling 326 to drive each of the lights 310a in the edge backlight device 310 to produce light having the same brightness, while in other examples discussed below, such backlight driving information may be provided over one or more couplings 326 to drive different subsets of the lights 310a in the edge backlight device 310 to produce light having the different brightnesses.

In the illustrated embodiment, the computing device connector 324 includes respective couplings to each of the plurality of array backlight zones on the array backlight device 312 that are each configured to transmit backlight driving information to one of the array backlight zones provided on the array backlight device 312. For example, couplings 328, 330, 332, and 334 may be provided between the computing device connector 208 and respective ones of the plurality of array backlight zones, as illustrated, and one of skill in the art in possession of the present disclosure will recognize that similar couplings may be provided between the computing device connector 324 and the others of the plurality of array backlight zones illustrated in FIG. 3A. As discussed below, each of the couplings to the array backlight zones are configured to transmit backlight driving information to the array backlight device 312, and backlight driving information provided for any particular array backlight zone may be configured to drive each of the lights in that array backlight zone to produce light having a particular brightness such that different array backlight zones provided on the array backlight device 312 may be driven to produce light having different brightnessses. While a specific display device has been illustrated and described, one of skill in the art in possession of the present disclosure will recognize that a wide variety of different components and configurations may be provided, only some of which are discussed below, that will fall within the scope of the present disclosure.

Figure 4:
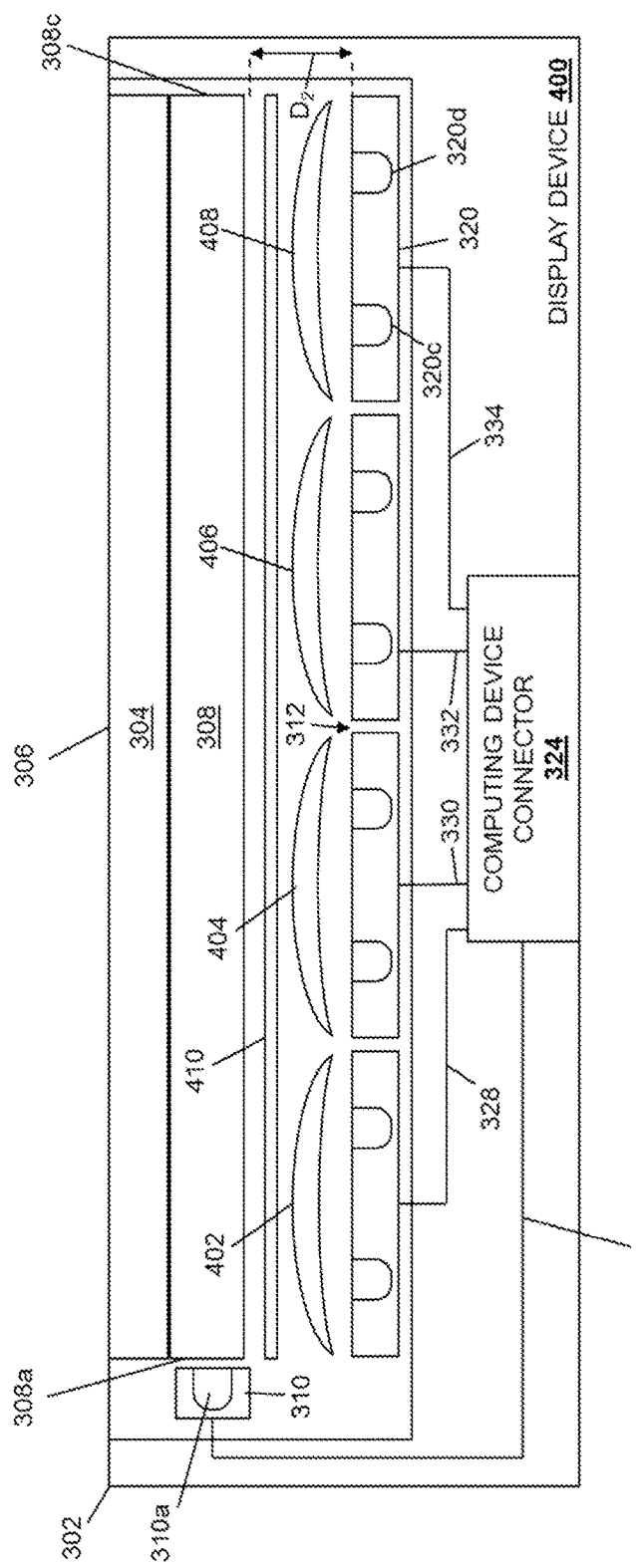
FIG. 4 is a side schematic view illustrating an embodiment of the display device of FIG. 3A.

Referring now to FIG. 4, an embodiment of a display device 400 is illustrated that is may be the display device 204 discussed above with reference to FIG. 2. In the illustrated embodiment, the display device 400 is substantially similar to the display device 300 discussed above with reference to FIGS. 3A and 3B such that similar components in the display device 300 and the display device 400 are provided the same reference numbers. In the illustrated embodiment, the display chassis 302 of the display device 400 houses a respective lens positioned adjacent each of the plurality of array backlight zones provided on the array backlight device 312 and between those array backlight zones and the light guide device 308. For example, a lens 402 is illustrated as positioned adjacent one of the plurality of array backlight zones, a lens 404 is illustrated as positioned adjacent one of the plurality of array backlight zones, a lens 406 is illustrated as positioned adjacent one of the plurality of array backlight zones, a lens 408 is illustrated as positioned adjacent one of the plurality of array backlight zones, and one of skill in the art in possession of the present disclosure will recognize that similar lenses may be positioned adjacent the other array backlight zones that are not visible in FIG. 4. In some examples, the lenses may be Fresnel lenses that are configured such that light emitted from the lights in their adjacent array backlight zone is diffused a desired amount before it reaches the light guide device 308. However, other types of lenses are envisioned as falling within the scope of the present disclosure. In some embodiments, a diffuser film 410 may be positioned between each of the plurality of lenses and the light guide device 308 to provide further uniformity for light diffused by the lenses. In the embodiment illustrated in FIG. 4, the lenses (and in some embodiments, the diffuser film 410) provide for the spacing apart of the array backlight device 312 and the light guide device 308 by a distance $D_2$ that is less than the distance $D_1$ between the array backlight device 312 and the light guide device 308 in the display device 300 discussed above with reference to FIG. 3B. As such, the lenses (and in some embodiments, the diffuser film 410) in the display device 400 may be utilized when reductions in thickness of the display device 400 are desirable.

Figure 5A:
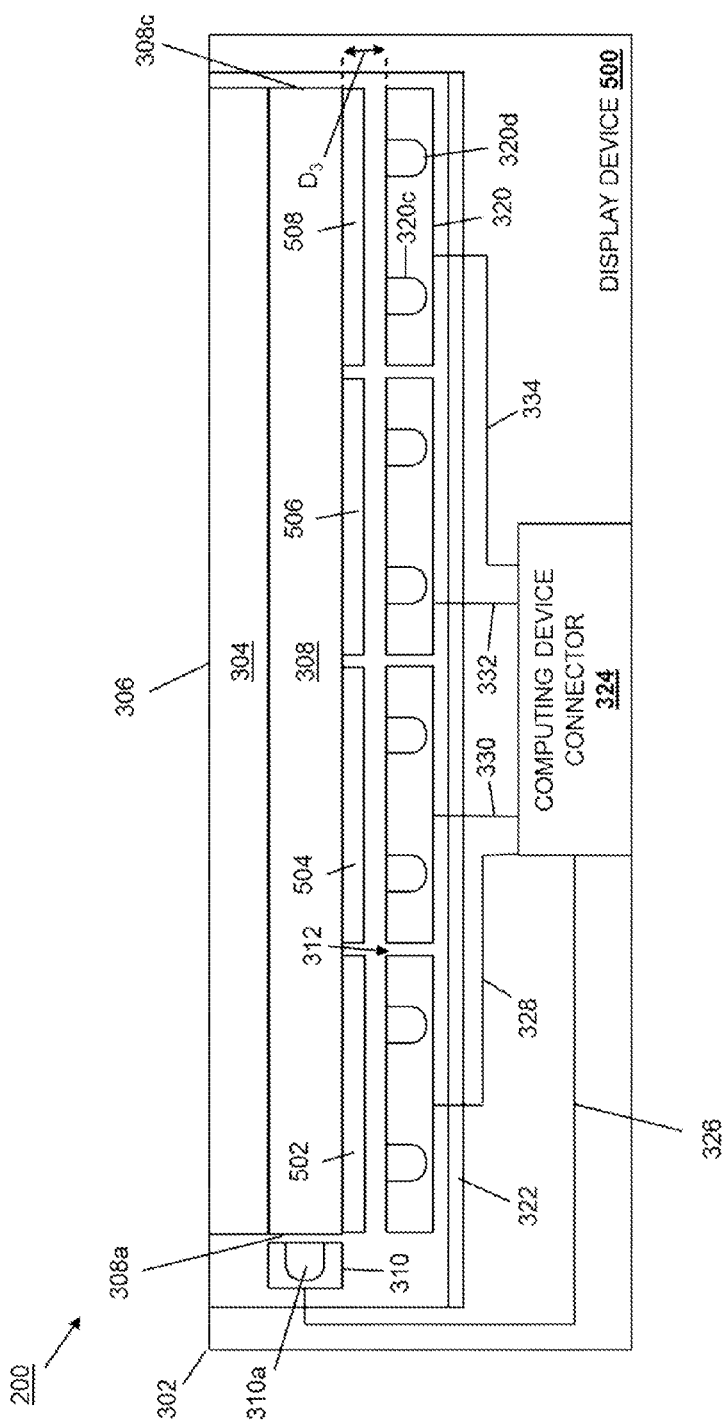
FIG. 5A is a side schematic view illustrating an embodiment of the display device of FIG. 3A.

Referring now to FIG. 5A, an embodiment of a display device 500 is illustrated that is may be the display device 204 discussed above with reference to FIG. 2. In the illustrated embodiment, the display device 500 is substantially similar to the display device 300 discussed above with reference to FIGS. 3A and 3B such that similar components in the display device 300 and the display device 500 are provided the same reference numbers. In the illustrated embodiment, the display chassis 302 of the display device 500 includes a respective lens positioned adjacent each of the plurality of array backlight zones provide on the array backlight device 312 and between those array backlight zones and the light guide device 308. For example, a lens 502 is illustrated as positioned adjacent one of the plurality of array backlight zones, a lens 504 is illustrated as positioned adjacent one of the plurality of array backlight zones, a lens 506 is illustrated as positioned adjacent one of the plurality of array backlight zones, a lens 508 is illustrated as positioned adjacent one of the plurality of array backlight zones, and one of skill in the art in possession of the present disclosure will recognize that similar lenses may be positioned adjacent the other array backlight zones that are not visible in FIG. 5. In some examples, the lenses may be Fresnel lenses that are embossed on the light guide device 308 and configured such that light emitted from the lights in their adjacent array backlight zone is diffused a desired amount as it enters the light guide device 308. However, other types of lenses may be provided on the light guide device 308 while falling within the scope of the present disclosure. In the embodiment illustrated in FIG. 5, the lenses provide for the spacing apart of the array backlight device 312 and the light guide device 308 by a distance $D_3$ that is less than the distance $D_1$ between the array backlight device 312 and the light guide device 308 in the display device 300 discussed above with reference to FIG. 3B, and less than the distance $D_2$ between the array backlight device 312 and the light guide device 308 in the display device 400 discussed above with reference to FIG. 4. As such, the lenses in the display device 500 may be utilized when further reductions in thickness of the display device 500 are desirable.

Referring now to FIG. 5B, and embodiment of the lens 502 and the light guide 308 of FIG. 5A is illustrated, and one of skill in the art in possession of the present disclosure will recognize that each of the lenses and the light guide 308 discussed above with reference to FIG. 5A may have the same or a similar configuration. As can be seen, an interface 510 is provided between the lens 502 and the light guide 308, and as discussed above, in some embodiments the interface 510 may be provided through an embossing process that provides the Fresnal lens on the light guide device 308. In the illustrated embodiment, the interface includes first interface sections 510a and 510b that are substantially uniform, and a second interface section 510c that is positioned between the first interface sections 510a and 510b and that varies along its length. As discussed below, in some embodiments, the first and second interface sections 510a and 510b are configured to distribute light provided by the lights in the adjacent array backlight zone such that that light is emitted from the light guide device 308 in a substantially perpendicular orientation to the surface of the light guide device 308 that is opposite the light guide device 308 from the lens 502. However, as also discussed below, the first and second interface sections 510a and 510b may be configured to distribute light provided by the lights in the adjacent array backlight zone such that that light is emitted from the light guide device 308 in non-perpendicular orientations depending on the desired characteristics of the display device 500.

Figure 6:
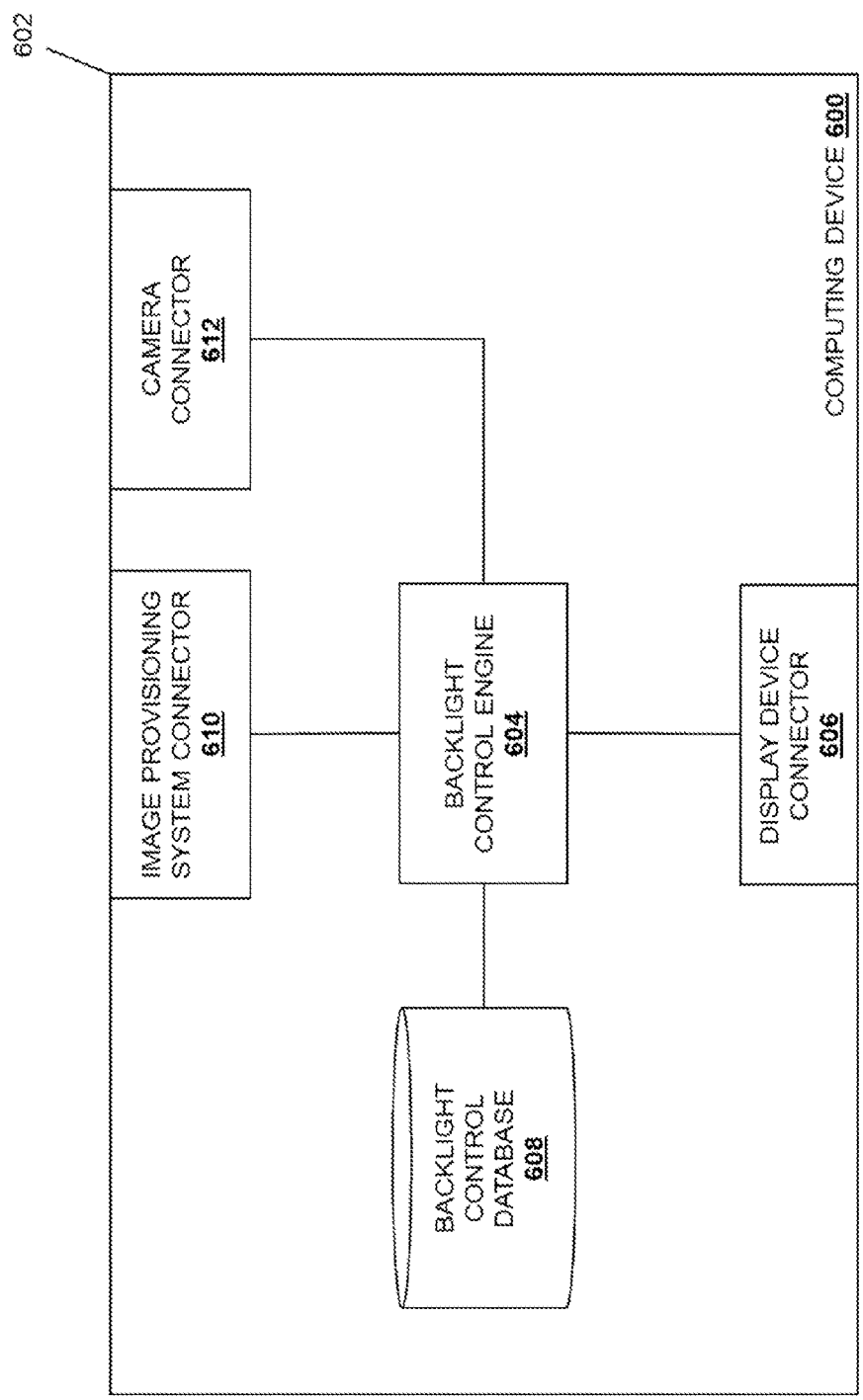
FIG. 6 is a schematic view illustrating an embodiment of a computing device used in the multiple backlight display system of FIG. 2.

Referring now to FIG. 6, an embodiment of a computing device 600 is illustrated that may be the computing device 202 discussed above with reference to FIG. 2. As such, the computing device 600 may be the IHS 100 discussed above with reference to FIG. 1 and/or may include some or all of the components of the IHS 100. As also discussed above, some or all of the components of the computing device 600 may be provided in the display devices discussed above while remaining within the scope of the present disclosure. The computing device 600 includes a computing chassis 602 that houses the components of the computing device 600, only some of which are illustrated for clarity of illustration and discussion. In an embodiment, the computing chassis 602 houses a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a backlight control engine 604 that is configured to perform the functions of the backlight control engines and computing devices discussed below. In specific embodiments, the processing system may be a graphics processing system (e.g., a Graphics Processing Unit (GPU)) and the memory system may include image management software.

In the illustrated embodiment, the computing chassis 602 also houses a display device connector 606 that is coupled to the backlight control engine 604 (e.g., via a coupling between the processing system and the display device connector 606) and that is configured to couple (e.g., via a cable, wirelessly, etc.) to the display devices discussed above. The computing chassis 602 also houses a storage system (not illustrated, but which may include the storage device 108 discussed above with reference to FIG. 1) that includes an backlight control database 608 that stores array backlight information about the array backlight zones, color device zone information about the locations, dimensions, and/or other features of the array backlight zones that define the color device zones on the color device 304, image characteristics such as, for example, color characteristics, sharpness characteristics, and/or other image characteristics that may be a function of brightness characteristics and that may be utilized by the backlight control engine 604 as discussed below, and/or a variety of other backlight control information that may enable the functionality discussed below. In the illustrated embodiment, the computing chassis 602 also houses an image provisioning system connector 610 that is coupled to the backlight control engine 604 (e.g., via a coupling between the processing system and the image provisioning system connector 610) and that is configured to couple (e.g., via a cable, wirelessly, etc.) to an image provisioning system that is configured to provide images (which may include still images and/or video) to the computing device 600.

In some embodiments the computing device 600 may be coupled to an image provisioning system such as, for example, an external storage device, a server (e.g., via a network connector), and/or other image provisioning devices known in the art through the image provisioning system connector 610. However, in some examples, images may be provisioned via a storage device that is housed in the computing chassis 602 of the computing device 600 and that is coupled to the backlight control engine 604, and thus the image provisioning system connector 610 may be omitted or not utilized. The computing chassis 602 also houses a camera connector 612 that is coupled to the backlight control engine 604 (e.g., via a coupling between the processing system and the camera connector 612) and that is configured to couple (e.g., via a cable, wirelessly, etc.) to a camera (e.g., the camera 208 discussed above with reference to FIG. 2) that is configured to capture and provide images (which may include still images and/or video) of user(s) of the computing device 600. While a specific embodiment of a computing device 600 has been described, one of skill in the art in possession of the present disclosure will recognize that a wide variety of different components and configuration of the computing device 600 (including the integration of the computing device components with a display device into a display system) will fall within the scope of the present disclosure.

Figure 7:
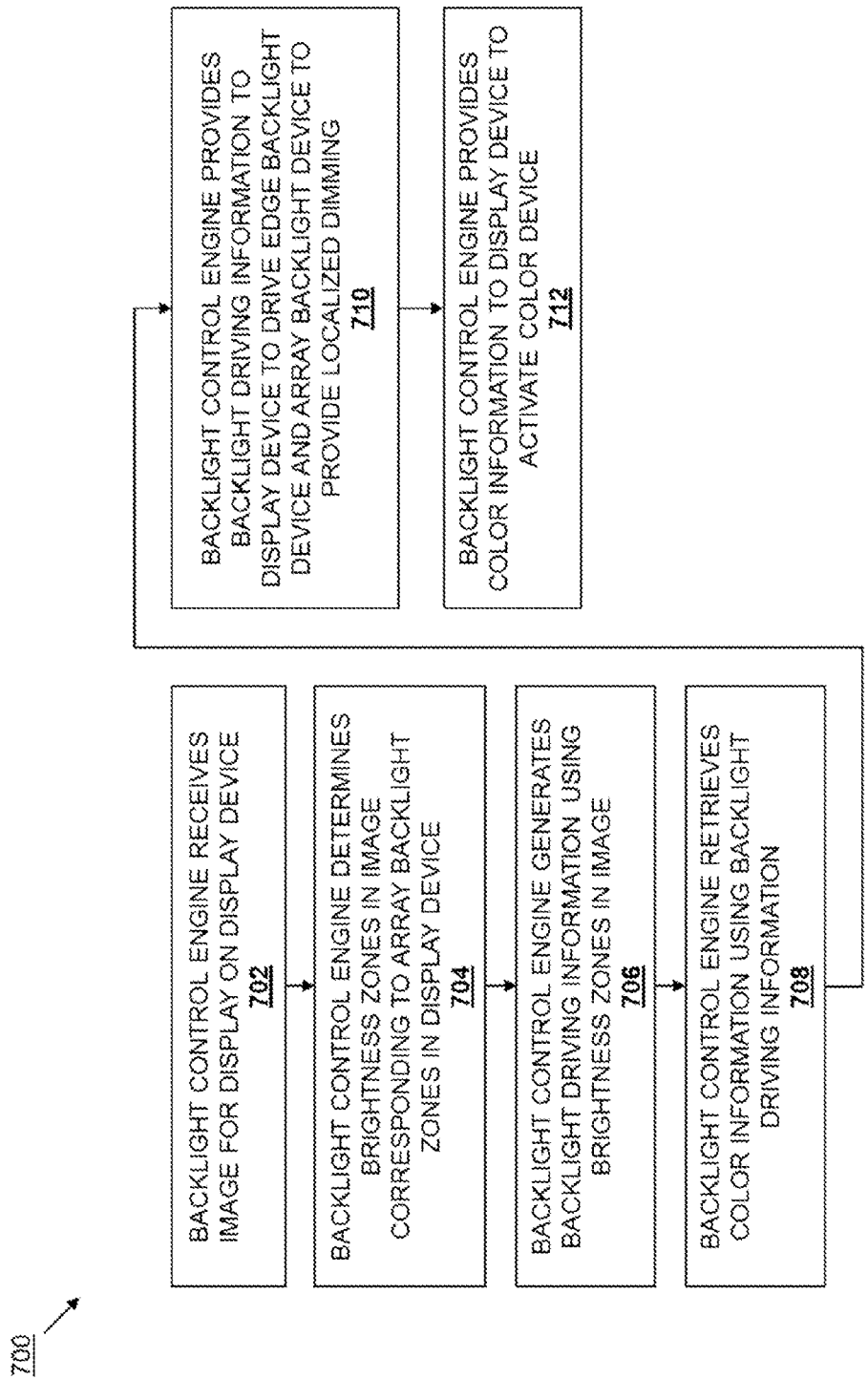
FIG. 7 is a flow chart illustrating an embodiment of a method for backlighting a display device.

Referring now to FIG. 7, an embodiment of a method 700 for operating multiple backlight devices in a display system is illustrated. As discussed below, a display device may be provided with both edge backlight device(s) and an array backlight device located adjacent a light guide device, and when an image is received for display on the display device, that image may be analyzed to determine a plurality of brightness zones that correspond to respective array backlight zones in the array backlight device. Those brightness zones may be used to generate backlight driving information that may differ between brightness zones, and that backlight driving information may be provided to drive the edge backlight device to produce light having a first brightness, while driving different array backlight zones on the array backlight device to produce light having different brightnesses in order to provide localized dimming/brightness for the image displayed on the display device. As such, true localized dimming/brightness for images may be provided to enhance desired portions of the image without the degradation of other portions of the image.

The method 700 begins at block 702 where a backlight control engine receives an image for display on a display device. In an embodiment, the backlight control engine 604 in the computing device 600 may receive an image for display on the display device 300. As discussed above, the "image" received at block 702 may be a still image, or one of a plurality of images received in a video (in which case the method 700 may be performed for each image, or subsets of images, included in the video). For example, the backlight control engine 604 may receive the image through the image provisioning system connector 610 that is connected to an image provision system such as, for example, an external storage system that is coupled to the image provisioning system connector 610, a server that is coupled to the image provisioning system connector through a network, a different computing device that is coupled to the image provisioning system connector 610, and/or from a variety of other image provisioning systems known in the art. Furthermore, as also discussed above, in some examples the backlight control engine 604 may receive the image from an image provisioning system (e.g., a storage system) that is housed in the computing chassis 602 in some other manner than through the image provision system connector 610. As such, at block 702 videos and/or other images may be provided to the computing device or a display system that includes the backlight control engine 604 for display.

The method 700 then proceeds to block 704 where the backlight control engine determines brightness zones in the image that correspond to array backlight zones in the display device. In an embodiment, the backlight control engine 604 may analyze the image received at block 702 and determine a plurality of brightness zones in the image. For example, the backlight control engine 604 may retrieve array backlight device information from the backlight control database 608 that describes the array backlight zones provided by the array backlight device 312, and divide the frame of the image received at block 702 into a plurality of brightness zones such that each brightness zone corresponds to a respective array backlight zone provided on the array backlight device 312. As discussed above, while each of the array backlight zones provided by the array backlight device 312 are illustrated and described as substantially square/rectangular (which may result in substantially square/rectangular brightness zones determined at block 704), in other embodiments the array backlight zones may have different shapes and/or dimensions (e.g., square, rectangular, triangular, hexagonal, and/or other shapes which may vary between array backlight zones) such that corresponding shaped/dimensioned brightness zones are determined at block 704. Furthermore, in some embodiments, brightness zones may encompass more than one array backlight zone provided by the array backlight device 312.

The method 700 then proceeds to block 706 where the backlight control engine generates backlight driving information using the brightness zones determined in the image. In an embodiment, the backlight control engine 604 may use the brightness zones determined for the image at block 704 to generate backlight driving information. For example, for each brightness zone determined for the image, the backlight control engine 604 may scan line(s) in the image that are included in that brightness zone to determine the desired output for that portion of the image and a corresponding brightness that may be used to provide that output. In some embodiments, each line in a brightness zone may be scanned at block 706 to determine the output for that line, and a corresponding average brightness may be determined that may be used to provide the output on those lines in that brightness zone. In other embodiments, subsets of the lines in a brightness zone (e.g., one line, less than all the lines, non-adjacent lines, etc.) may be scanned at block 706 to determine the output for that subset, and a corresponding average brightness may be determined that may be used to provide the output on that subset. In a specific embodiment, the generation of the backlight driving information may at block 706 may include the generation of brightness zone histograms for each of the brightness zones in the image in order to perform the functions discussed above. While a few examples of the generation of backlight driving information have been provided above, one of skill in the art in possession of the present disclosure will recognize that a variety of techniques for determining the backlight driving information will fall within the scope of the present disclosure. Furthermore, one of skill in the art in possession of the present disclosure will recognize that as the array backlight zones become smaller and greater in number, the techniques discussed above may become accurate in providing the localized brightness and dimming described herein.

A specific example of the generation of backlight driving information for a single image will now be provided, but one of skill in the art will recognize that a variety of different types of images may be used to generate backlight driving information in a similar manner while remaining within the scope of the present disclosure. References to areas of the image in this example (e.g., upper, lower, left, right) are made with respect to how the image would be displayed according to the front view of the display device 300 in FIG. 3A (e.g., the array backlight zone 314 being in an "upper left corner", the array backlight zone 320 being in a "lower right corner", and so on). In this example, an image may be received that includes the sun in an upper left corner of the image along with the sky in the upper half of the image, and buildings and shadows in the lower half of the image. At block 706, the backlight control engine 604 may generate backlight driving information by determining that a first brightness zone that corresponds to the array backlight zone 314 includes a relatively high brightness output (e.g., due to the sun being displayed in that portion of the image), while the remaining brightness zones that correspond to the array backlight zones provided in the top half of the array backlight device 312 include a relatively intermediate brightness output that is less than that of the first brightness zone (e.g., due to the sky being displayed in that portion of the image), and that the brightness zones that correspond to the array backlight zones provided in the bottom half of the array backlight device 312 include a relatively low brightness output that is less than that of the first brightness zone and remaining brightness zones in the top half of the image (e.g., due to the buildings and shadows being displayed in that portion of the image). One of skill in the art in possession of the present disclosure will recognize that this simple example may be extended to relatively complex images and larger numbers of array backlight zones and brightness zones.

In the embodiments discussed below, the backlight driving information is configured to drive the array backlight zones provided by the array backlight device 312 and the edge backlight device 310 as well, as discussed in further detail below. However, in some embodiments, the backlight driving information may be configured to drive the array backlight zones provided by the array backlight device 312, while a different subsystem may be configured to drive the edge backlight device 310 to produce light having a brightness that is retrievable or otherwise known by the backlight control engine 604. Furthermore, the determinations of the level of brightness to be provided by any particular backlight driving information may be defined by user preferences, default values, systems settings, environment conditions (e.g., as determined by ambient sensors), and/or other information known in the art. For example, a desired maximum brightness for any element displayed in an image may be defined, a desired maximum dimness for any element displayed in an image may be defined, brightness/dimness characteristics for different applications and/or functions of the display device may be defined, low-power brightness characteristics may be defined, and/or other information may be used to determine how bright a relatively high brightness portion of an image should be made, how bright a relatively intermediate brightness portion of an image should be made, and how bright a relatively low brightness portion of an image should be made. In addition, the level of brightness to be provided by any particular backlight driving information may depend on the relatively brightness of each of the portions of an image (e.g., an image that is predominantly of a relatively low brightness may have a relatively high brightness portion provided by backlight driving information that would produce a lower brightness than the same relatively high brightness portion would have in an image that is predominantly of a relatively intermediate brightness). As such, one of skill in the art will appreciate a wide variety of factors that may be considered in the determination of the brightness to be provided by the backlight driving information.

The method 700 then proceeds to block 708 where the backlight control engine retrieves color information using the backlight driving information. In an embodiment, the backlight control engine 604 may use the backlight driving information that was determined at block 706, which is configured to drive each array backlight zone provided on the array backlight device 312 and the edge backlight device 310 in order to produce light of desired brightnesses in each of the array backlight zones, to retrieve color information from the backlight control database 608 for activating the color device 304 to provide a plurality of colors in each of the color device zones. For example, for each of the plurality of array backlight zones and corresponding color device zones, the backlight driving information generated to produce a desired brightness from the array backlight device 312 and the edge backlight device 310 may be used by the backlight control engine 604 to retrieve color information that is configured to activate the color device 304 to produce a plurality of desired colors (as dictated by the image) in that color device zone at the desired brightness. In a specific example, the color information may include RGB values that cause the RGB sub-pixels in each pixel of the color zone to filter light produced by the edge backlight device 310 and the array backlight zone provided by the array backlight device 312 to produce colors through each of those pixels that are dictated by the image. Similarly to the color information determined at block 708, sharpness information, color correction information, and/or other image performance information may be retrieved at block 708 such that each color device zone may produce its associated portion of the image with the appropriate image characteristics that may depend on the brightness of the light that is produced by the edge backlight device 310 and the array backlight zone provided by the array backlight device 312.

The method 700 then proceeds to block 710 where the backlight control engine provides the backlight driving information to the display device to drive the edge backlight device and the array backlight device to provide localized dimming, and block 712 where the backlight control engine provides the color information to the display device to activate the color device. While the blocks 710 and 712 are illustrated separately, one of skill in the art in possession of the present disclosure will recognize that they may be performed substantially simultaneously to produce an image on the display device. In an embodiment, at blocks 710 and 712, the backlight control engine 604 may provide the backlight driving information and the color information (as well as any other image characteristic information) through the display device connector 606 to the display device 300 such that it is provided to the edge backlight device 310, each array backlight zone provided by the array backlight device 312, and the color device 304.

Figure 8:
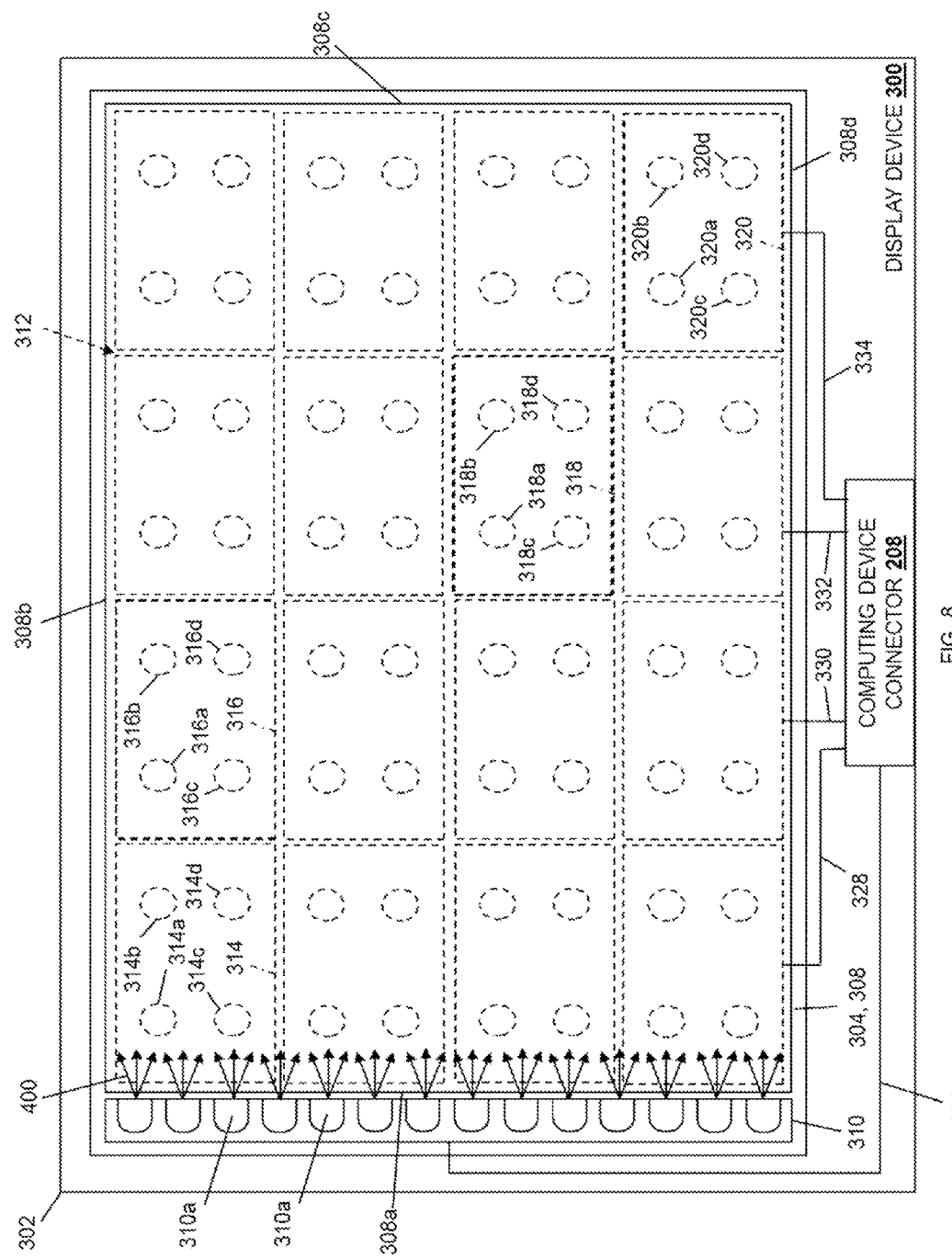
FIG. 8 is a schematic view illustrating an embodiment of the operation of the display device of FIG. 3A during the method of FIG. 8.

For example, referring now to FIG. 8, the backlight driving information may include edge backlight driving information that is provided through the computing device connector 208 and the coupling 326 to the edge backlight device 310 in order to drive the edge backlight device 310 and cause the lights 310a in the edge backlight device 310 to emit light 800. As discussed above, in some embodiments the light emitted by the lights 310a in the edge backlight device 310 may enter the light guide device 308 to provide a uniform brightness (e.g., each of the lights 310a in the edge backlight device 310 may be driven at the same level to produce light having the same brightness). However, in some embodiments, the edge backlight driving information (and the edge backlight device 310) may be configured to drive different lights 310a in the edge backlight device 310 at different levels to produce light having different brightnesses (e.g., according to a desired brightness for a portion of the image that is provided by that light 310a in the edge backlight device 310.) In either embodiment, the light 400 provided by the edge backlight device 310 into the light guide device 308 will be of a known brightness that is dictated by the edge backlight driving information determined by the backlight control engine 604.

Furthermore, as discussed above, respective edge backlight devices may be provided along a plurality of different edges 308a-d of the light guide device 308, and at block 710 the edge backlight driving information may be provided to each of the edge backlight devices. For example, a plurality of a edge backlight devices may be utilized in the multiple backlight display system to provide "1-dimensional" dimming by driving two perpendicularly oriented edge backlight devices (e.g., along edges 308a and 308b of the light guide device 308) using edge backlight driving information that causes those edge backlight devices to emit light that may overlap to produce localized brightness/dimming on the display screen 306. Similarly as discussed above, in such multiple edge backlight embodiments, the edge backlight driving information (and the edge backlight devices) may be configured to drive different lights in the edge backlight devices at different levels to produce light having different brightnesses as well.

Figure 9:
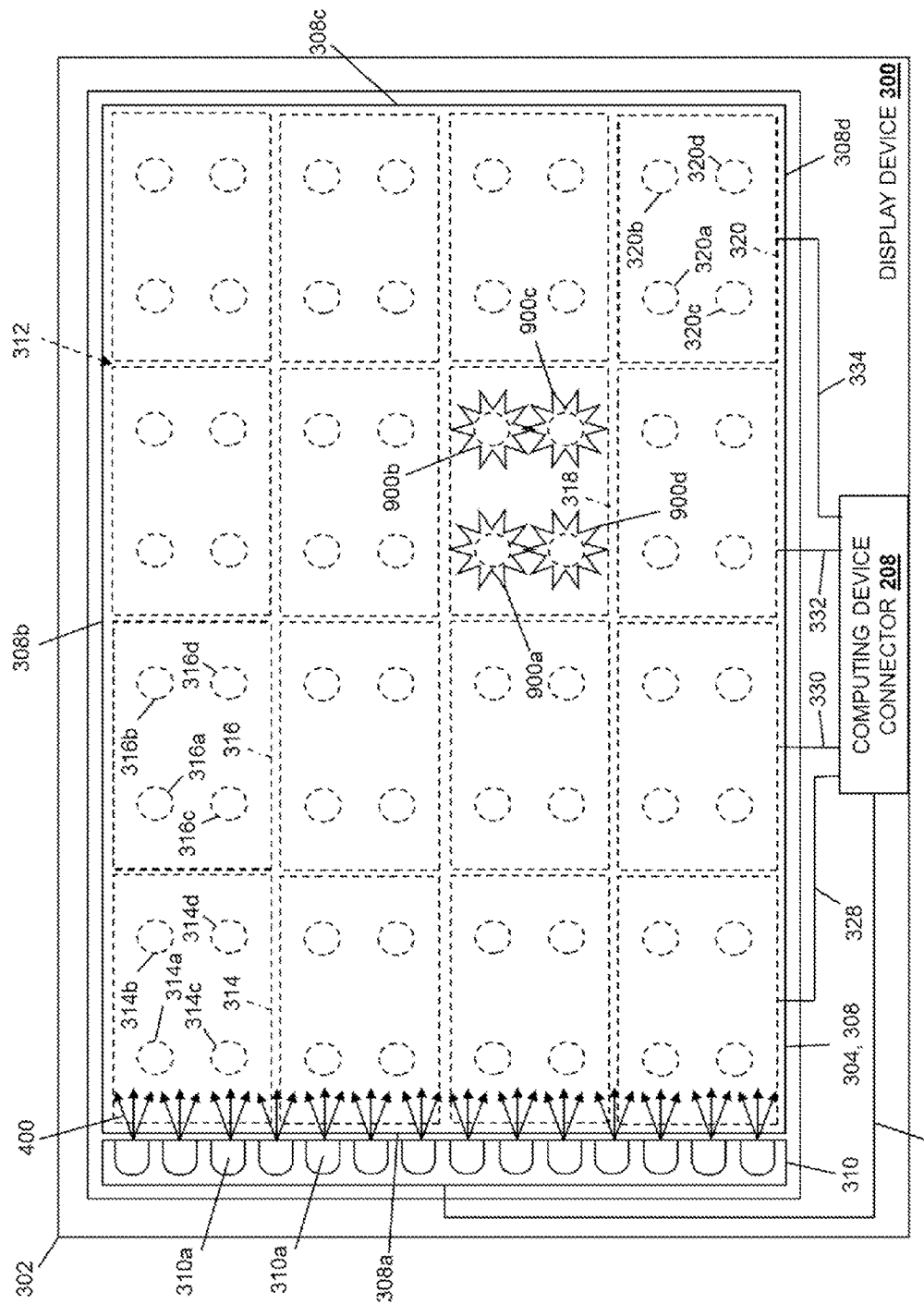
FIG. 9 is a schematic view illustrating an embodiment of the operation of the display device of FIG. 3A during the method of FIG. 8.
Figure 10:
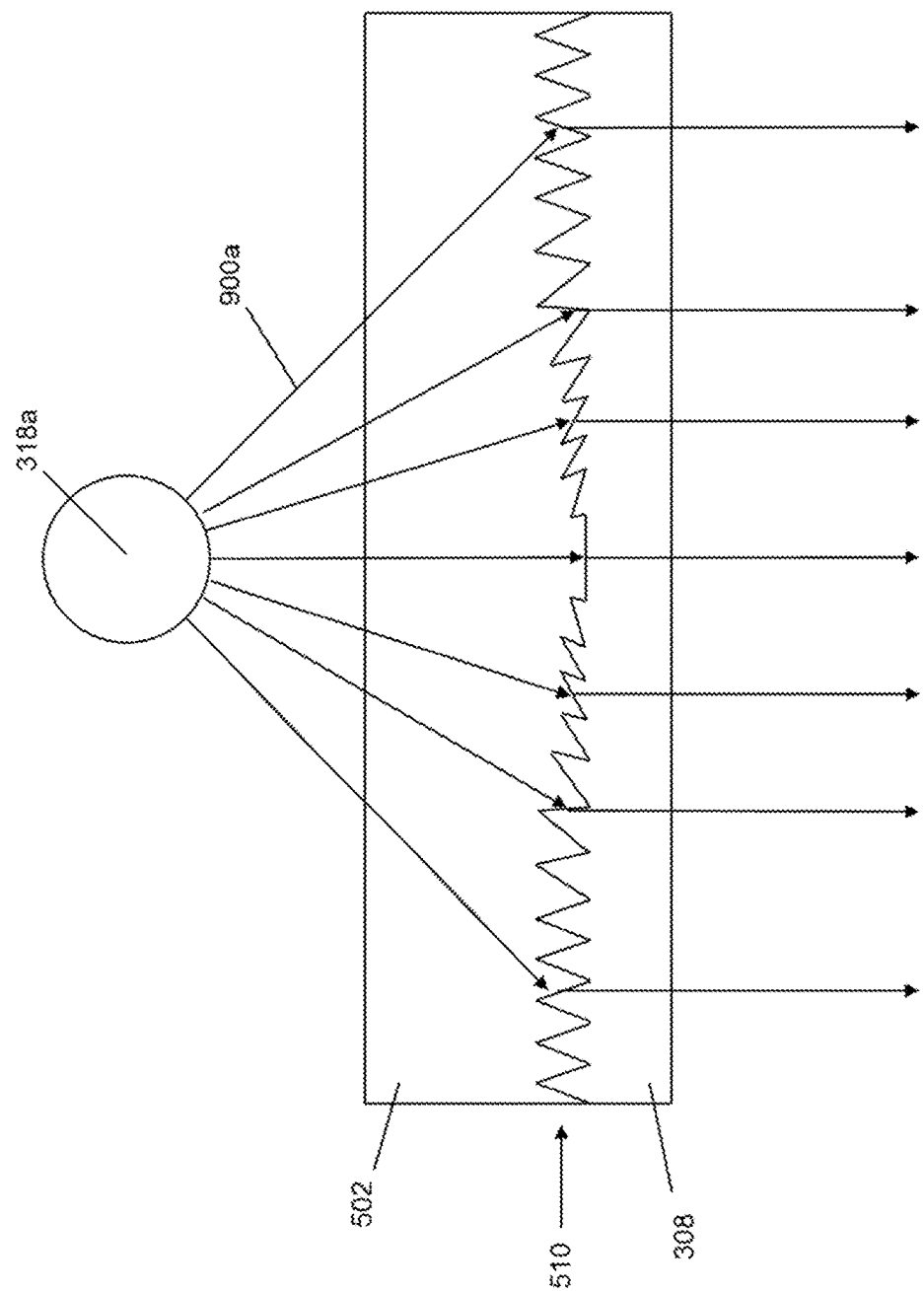
FIG. 10 is a schematic view illustrating an embodiment of the operation of the lens and light guide of FIG. 6 in the display device of FIGS. 5A and 5B during the method of FIG. 8.

Referring now to FIG. 9, the backlight driving information may include array backlight zone driving information that is provided through the computing device connector 208 and the couplings (e.g., 328, 330, 332, and 334) to each of the array backlight zones provided by the array backlight device 312 in order to drive at least some of the array backlight zones provided by the array backlight device 310 and cause the lights in those array backlight zone(s) provided by the array backlight device 312 to emit light. FIG. 9 illustrates the lights 318a-d in the array backlight zone 318 provided by the array backlight device 312 being driven to emit light 900a, 900b, 900c, and 900d. The light emitted by the lights 318a-d in the array backlight zone 318 provided by the array backlight device 312 may enter the light guide device 308 to provide a uniform brightness (e.g., each of the lights 318a-d in the array backlight zone 318 provided by the array backlight device 312 may be driven at the same level to produce light having the same brightness). FIG. 10 illustrates the light 318a providing light through the lens 502 and light guide device 308 (discussed above with reference to FIG. 5B), which are configured to allow the light to exit the light guide device 308 at an orientation that is substantially parallel to the surface of the light guide device 308, and one of skill in the art in possession of the present disclosure will recognize that each of the lights 318b-d may operate in a substantially similar manner. Furthermore, while only one array backlight zone provided by the array backlight device 312 is illustrated and discussed as being driven to emit light, one of skill in the art in possession of the present disclosure will recognize that any of the array backlight zones provided by the array backlight device 312 may be driven in a substantially similar manner, and different combinations of the array backlight zones provided by the array backlight device 310 may be driven to produce light of different brightness as is dictated by the image that is to be displayed.

The light emitted from the array backlight zone(s) provided by the array backlight device 312 and into the light guide device 308 will be of a brightness that, when combined with the light provided by the edge backlight device 310, will produce the desired brightness at that array backlight zone that was determined at block 704 for the image. In other words, the combination of the edge backlight driving information and the array backlight driving information will drive the edge backlight device 310 and at least one of the array backlight zones provided by the array backlight device 312 to produce a combined light that has the desired brightness determined for that array backlight zone/brightness zone in the image. As such, different portions of the screen on the display device may be provided localized brightness and dimming through the operation of the array backlight zone(s) on the array backlight device 312 to emit light that adds to the light emitted from the edge backlight device 310. Furthermore, the color information (and/or other image characteristic information) provided to the color device 304 will active the color device zones on the color device 304 such that the color device 304 produces colors in each of those color device zones as is dictated by the image as well as the brightness of the light emitted by the combination of the edge backlight device 310 and the associated array backlight zone provided by the array backlight device 312. In other words, different array backlight zone/color device zone combinations may emit light having the same color but different brightnesses based on the operation of their respective array backlight zones (e.g., providing light of different brightness) and color device zones (which utilize different color information to produce light of the same color at the different brightnesses).

A variety of other features may be provided with the multiple backlight display system that may be utilized to enhance its operation. As discussed above, in some embodiments, the determinations of the desired brightness of light emitted at array backlight zones may be based on static preferences for brightness of images and/or portions of images, applications, and/or other factors. However, in some embodiments, the desired brightness of light emitted at array backlight zones may be based on more dynamic factors such as the environmental/ambient conditions discussed above, as well as other dynamic factors that may include which part of the image a user is currently viewing. In one embodiment, images captured by the camera 208 may be provided through the camera connector 612 to the backlight control engine 604. The backlight control engine 604 may be configured to analyze those images to detect the eyes of a user (e.g., via image recognition and/or other techniques known in the art), determine a direction of viewing of the users eyes, determine a portion of the display screen 306 that the user is currently viewing, and determining the desired brightness of light emitted at array backlight zones using the portion of the display screen 306 that the user is currently viewing. For example, the desired brightness of light emitted at an array backlight zone that corresponds to a portion of the display screen 306 that the using is currently viewing may be made relatively brighter than immediately adjacent portions of the display screen 306, which may be made relatively brighter than portions of the display screen 204a that are not immediately adjacent the portion of the display screen 306 that the using is currently viewing. In another example, the desired brightness of light emitted at an array backlight zone that corresponds to a portion of the display screen 306 that the using is currently viewing may be made relatively dimmer than immediately adjacent portions of the display screen 306, which may be made relatively dimmer than portions of the display screen 306 that are not immediately adjacent the portion of the display screen 306 that the using is currently viewing. As such, control of the edge backlight device 310 and the array backlight zones provided by the array backlight device 312 may be based on the portion of the image/display screen 306 that is being directly viewed by the user.

In another example of control enhancements to the multiple backlight display system, in some embodiments the array backlight device 312 may be deactivated such that none of the array backlight zones provided by the array backlight device 312 emit light. For example, a user may be given an option to deactivate the array backlight device 312, or provide settings such the array backlight device 312 is only utilized as discussed above with certain applications (e.g., the array backlight device 312 may not be utilized with email or other communication applications, word processing or other productivity applications, etc., but may be utilized with video player applications, image viewing applications, etc.) In another example, a user may be given an option to drive each of the array backlight zones provided by the array backlight device 312 at a maximum or common brightness in order to provide a maximized brightness for the display screen 204a (e.g., in combination with the edge backlight device 310) for use in, for example, high ambient light environments. While a few examples have been provided, other combinations of the activations and/or deactivation of the array backlight device 312 and/or the edge backlight device 310 (e.g., deactivation of the edge backlight device 310 and use of only the array backlight device 312) will fall within the scope of the present disclosure.

Figure 11:
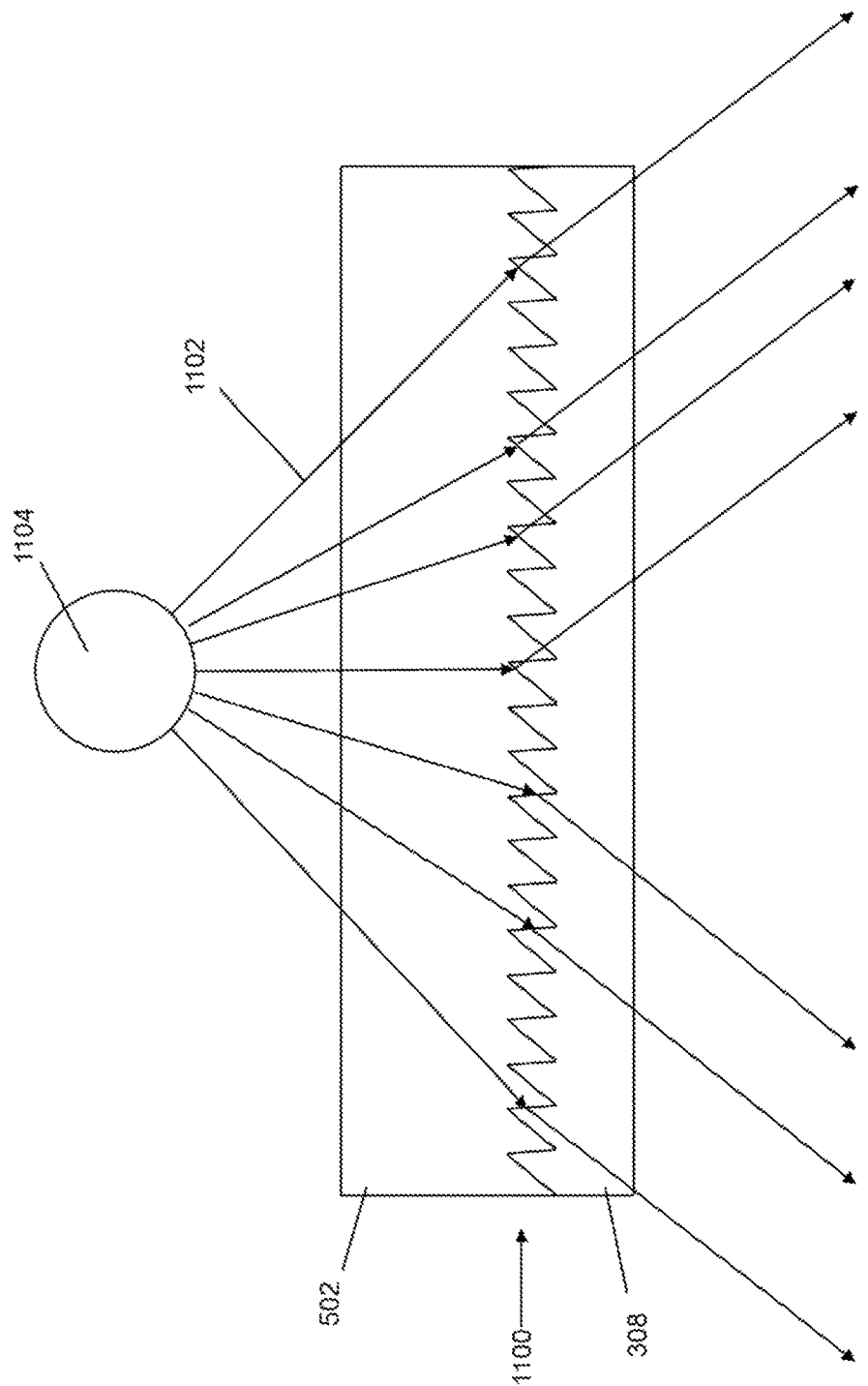
FIG. 11 is a schematic view illustrating an embodiment of the operation of a lens and light guide in an alternative embodiment of the display device of FIGS. 5A and 5B during the method of FIG. 8.

Furthermore, modifications to the array backlight device 312 and the array backlight zones provided by the array backlight device 312 may provide benefits in localized brightness and dimming. For example, different array backlight zones provided by the array backlight device 312 may be provided with different numbers and/or orientations of lights or light emitting devices in order to enhance different areas of the display screen 204a as desired. In specific examples, more lights may be provided in array backlight zones that are located adjacent the middle of the display screen 306, while fewer lights may be provided in array backlight zones that are located adjacent the edges of the display screen 306. Alternatively, fewer lights may be provided in array backlight zones that are located adjacent the middle of the display screen 306, while more lights may be provided in array backlight zones that are located adjacent the edges of the display screen 306. Furthermore, rather than (or in addition to) modifying the number of lights provided in each of the array backlight zones provided by the array backlight device 312, the lenses provided adjacent those array backlight zones may be modified. FIG. 11 illustrates the lens 502 and light guide device 308 discussed above with reference to FIG. 5B with a modified interface 1100 that causes light 1102 emitted from light(s) in the array backlight zones to be emitted from the surface of the light guide device 308 at some angle relative to that surface that is less than perpendicular from that surface. As would be understood by one of skill in the art in possession of the present disclosure, the utilization of interfaces between the lenses and light guide device such as that illustrated in FIG. 11 allows the brightness characteristics of the light emitted from any array backlight zone and through the lens/light guide device to be tuned to provide different brightness. For example, the lens/light guide device illustrated in FIG. 5B may be provided at the center of the display screen 204a to emit relative brighter light when the lights are driven at a particular level, while the lens/light guide device illustrated in FIG. 11 may be provided at the edges of the display screen 204a to emit relative dimmer light for a given driving of the lights.

Thus, systems and methods have been described that utilize both of an edge backlight device and an array backlight device in a display device to provide localized brightness and dimming in images displayed on a display device. Such systems and methods operate by analyzing images that are provided for display on the display device to determine brightness zones that correspond to array backlight zones provided by the array backlight device, and generating backlight driving information that is configured to drive the edge backlight device and different array backlight zones on the array backlight device to produce a combined light having different brightnesses in the different array backlight zones in order to provide localized dimming/brightness for appropriate portions of the image when it is displayed on the display device. As such, power-efficient localized dimming/brightness for images may be provided to enhance desired portions of the image without the degradation of other portions of the image.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:
1. A multiple backlight display system, comprising:
   a display device including:
   a light guide device including a plurality of edge surfaces and a primary surface that extends between the plurality of edge surfaces and that faces a different direction than each of the plurality of edge surfaces;
   an edge backlight device that is located along one of the plurality of edge surfaces of the light guide device and that is configured to direct light provided by the edge backlight device into that edge surface; and an array backlight device including a plurality of array backlight zones that are located between the plurality of edge surfaces of the light guide device and that are each configured to direct light provided by that array backlight zone into the primary surface;

a computing device that is coupled to the display device and configured to:

receive an image for display on the display device;

determine a plurality of brightness zones in the image;

generate backlight driving information using the plurality of brightness zones; and provide the backlight driving information to the display device, wherein the backlight driving information is used to:

drive the edge backlight device to provide light having a first brightness; and drive the array backlight device such that a first array backlight zone of the plurality of array backlight zones combines with edge backlight device to provide light having a second brightness that is greater than the first brightness, and at least one second array backlight zone of the plurality of array backlight zones does not receive power.

2. The multiple backlight display system of claim 1, further comprising:

a respective lens positioned adjacent each of the plurality of array backlight zones and configured to distribute light from that array backlight zone across a portion of the light guide device.

3. The multiple backlight display system of claim 2, wherein each respective lens is embossed on the light guide device.

4. The multiple backlight display system of claim 1, wherein the generating the backlight driving information using the plurality of brightness zones includes determining an average brightness of each of the plurality of brightness zones and generating the backlight driving information that includes respective array backlight zone driving information that is configured to drive each of the plurality of array backlight zones according to the average brightness of a corresponding brightness zone in the image.

5. The multiple backlight display system of claim 4, wherein average brightness of each of the plurality of brightness zones is determined using a respective single line of the image that is located in that brightness zone.

6. The multiple backlight display system of claim 1, further comprising:

a color device that is located adjacent the light guide device in the display device and that includes a plurality of color device zones, wherein a respective color device zone of the plurality of color device zones is located adjacent each of the plurality of array backlight zones, wherein the computing device is configured to:

retrieve color information using the backlight driving information; and provide the color information to the display device, wherein the color information is configured to activate the color device such that a first color device zone of the plurality of color device zones that is located adjacent the first array backlight zone provides a plurality of colors using the light having the second brightness, and wherein the color information is configured to activate the color device such that at least one second color device zone of the plurality of color device zones that is located adjacent the at least one second array backlight zone that does not receive power provides a plurality of colors using the light from the edge backlight device having the first brightness.

7. A display system, comprising:

a display chassis that houses:

a light guide device including a plurality of edge surfaces and a primary surface that extends between the plurality of edge surfaces and that faces a different direction than each of the plurality of edge surfaces;

an edge backlight device that is located along a first edge surface of the plurality of edge surfaces of the light guide device, wherein the edge backlight device is configured to be driven to provide light having a first brightness and direct that light into the first edge surface; and an array backlight device including a plurality of array backlight zones that are located between the plurality of edge surfaces of the light guide device and that are each configured to direct light provided by that array backlight zone into the primary surface, wherein the array backlight device is configured to be driven such that a first array backlight zone of the plurality of array backlight zones combines with the edge backlight device to provide light having a second brightness that is greater than the first brightness while the at least one second array backlight zone of the plurality of array backlight zones does not receive power.

8. The display system of claim 7, further comprising:

a respective lens positioned adjacent each of the plurality of array backlight zones and configured to distribute light from that array backlight zone across a portion of the light guide device.

9. The display system of claim 8, wherein each respective lens is embossed on the light guide device.

10. The display system of claim 7, further comprising:

a color device that is located adjacent the light guide device in the display chassis and that includes a plurality of color device zones, wherein a respective color device zone of the plurality of color device zones is located adjacent each of the plurality of array backlight zones, wherein the color device is configured to be activated such that a first color device zone of the plurality of color device zones that is located adjacent the first array backlight zone provides a plurality of colors using the light having the second brightness, and a second color device zone of the plurality of color device zones that is located adjacent the at least one second array backlight zone that does not receive power provides a plurality of colors using the light from the edge backlight device having the first brightness.

11. The display system of claim 7, further comprising:

a backlight control engine that is housed in the display chassis and that is configured to drive the array backlight device.

12. The display system of claim 7, further comprising:

a connector that is housed in the display chassis and that is coupled to the edge backlight device and the array backlight device, wherein the connector is configured to couple to a backlight control engine that is configured to drive the array backlight device.

13. A method for operating multiple backlight devices in a display system, comprising:

receiving, by a backlight control engine, an image for display on a display device that includes a light guide device having a plurality of edge surfaces, an edge backlight device that is located along one of the plurality of edge surfaces of the light guide device and configured to direct light generated by the edge backlight device into that edge surface, and an array backlight device including a plurality of array backlight zones that are located between the plurality of edges of the light guide device and that are each configured to direct light provided by that array backlight zone into a primary surface that extends between the plurality of edge surfaces and faces a different direction than each of the plurality of edge surfaces;

determining, by the backlight control engine, a plurality of brightness zones in the image;

generating, by the backlight control engine, backlight driving information using the plurality of brightness zones; and providing, by the backlight control engine, the backlight driving information to the display device to:
   drive the edge backlight device to provide light having a first brightness; and
   drive the array backlight device such a first array backlight zone of the plurality of array backlight zones combines with the edge backlight device to provide light having a second brightness that is greater than the first brightness while at least one second array backlight zone of the plurality of array backlight zones does not receive power.

14. The method of claim 13, wherein the display device includes a respective lens positioned adjacent each of the plurality of array backlight zones to distribute light from that array backlight zone across a portion of the light guide device.

15. The method of claim 14, wherein each respective lens is embossed on the light guide device.

16. The method of claim 13, wherein the generating the backlight driving information using the plurality of brightness zones includes:
   determining, by the backlight control engine, an average brightness of each of the plurality of brightness zones; and
   generating, by the backlight control engine, the backlight driving information that includes respective array backlight zone driving information that drives each of the plurality of array backlight zones according to the average brightness of a corresponding brightness zone in the image.

17. The method of claim 16, wherein average brightness of each of the plurality of brightness zones is determined using a respective single line of the image that is located in that brightness zone.

18. The method of claim 13, wherein the display device includes a color device that is located adjacent the light guide device and that includes a plurality of color device zones wherein a respective color device zone of the plurality of color device zones is located adjacent each of the plurality of array backlight zones, and wherein the method further comprises:
   retrieving, by the backlight control engine, color information using the backlight driving information; and
   providing, by the backlight control engine, the color information to the display device to activate the color device such that a first color device zone of the plurality of color device zones that is located adjacent the first array backlight zone provides a plurality of colors using the light having the second brightness, and such that at least one second color device zone of the plurality of color device zones that is located adjacent the at least one second array backlight zone that does not receive power provides a plurality of colors using the light from the edge backlight device having the first brightness.

* * * * *